June 21, 1932.   R. H. WHITEHEAD ET AL   1,864,108
SYNCHRONOUS MOTOR
Filed Nov. 26, 1929
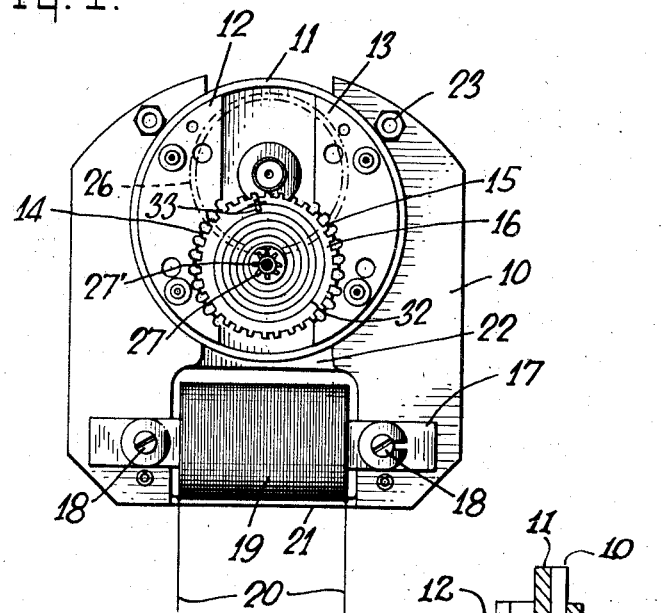
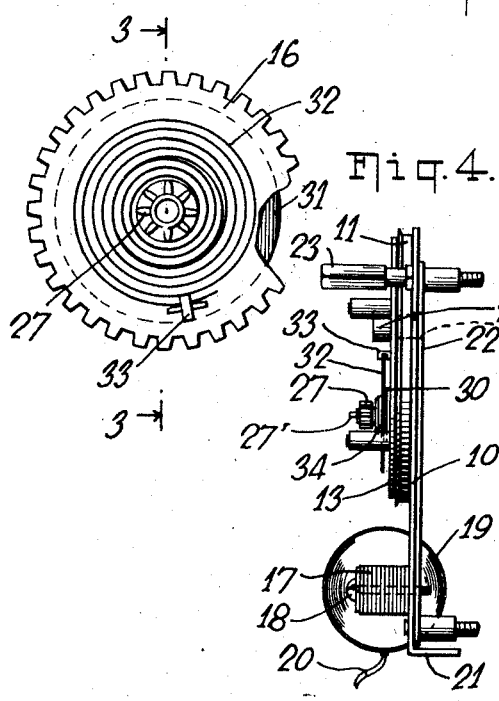
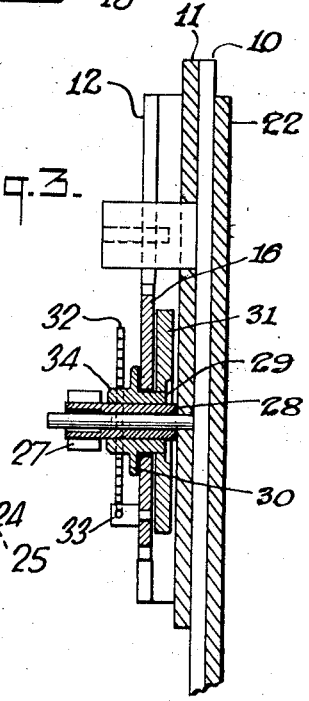
INVENTOR.
Richard H. Whitehead &
Wilson E. Porter.
BY
Warfield & Watson
ATTORNEYS.

Patented June 21, 1932

1,864,108

UNITED STATES PATENT OFFICE

RICHARD H. WHITEHEAD AND WILSON E. PORTER, OF NEW HAVEN, CONNECTICUT, ASSIGNORS TO THE NEW HAVEN CLOCK CO., OF NEW HAVEN, CONNECTICUT, A CORPORATION OF CONNECTICUT

SYNCHRONOUS MOTOR

Application filed November 26, 1929. Serial No. 409,809.

This invention relates to synchronous motors, and more particularly to rotor couplings for synchronous motors of the character adapted to drive clock-trains and the like.

The invention has for its object generally, an improved construction and arrangement of parts for synchronous motors of the character indicated, which is efficient, economical and readily manufactured.

More particularly, an object of the invention is to provide improved coupling and motion transmitting connection from the rotor to the power transmitting shaft associated with the motor.

A further object is to provide an inertia member and yielding connection between the motor and driving shaft of synchronous motors of the character indicated which permits uniform driving at substantially all times and accommodates the parts to small irregularities of the current without the liability of the motor getting out of step.

Still another object is to provide a rotor for a small synchronous motor with an inertia and oscillation damping member connected by means affording positive mechanical connection without the use of liquid or of small parts which are liable to get out of order.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawing, in which:

Fig. 1 is a front elevation of a synchronous motor constructed in accordance with the invention, parts of the rotor housing being removed for greater clarity.

Fig. 2 is an enlarged elevational view showing the rotor removed from the motor; a part being broken away;

Fig. 3 is a sectional view taken on the line 3—3 of Fig. 2; and

Fig. 4 is a side elevation of the motor shown in Fig. 1.

Referring now to the drawing, 10 denotes a stator for the motor which is of a generally U-shaped piece of magnetic material, the upper ends of the legs of which are bridged by a base plate 11 of a rotor housing which is constructed of non-magnetic material. On this base plate are disposed pole members or shoes 12 and 13 of magnetic material, the lower portions of the faces of which are cut along generally concave arcs as indicated at 14 and 15 respectively, this cut away portion accommodating the motor rotor which may be for example a disk of magnetic material, as shown at 16.

Across the legs of the U, near its base, is a magnetic yoke 17, which is secured by means of screws of magnetic material, as indicated at 18, in order thereby to be in good flux conducting relation with the stator. On this yoke is mounted an exciting winding 19 which has a pair of leads 20 for supplying energizing current thereto from any suitable source, for example, a 60-cycle, 110-volt source. The base of the U comprising the stator 10 is shown at 21 and preferably has a relatively small cross sectional area, since it serves as a magnetic shunt in the arrangement shown. This base, however, is preferably bent back into a plane which lies substantially at right angles to the plane of the legs of the U, as by this construction mechanical strength is imparted to the stator.

To further strengthen the stator, it is preferable also to back the same with a reinforcing plate 22 of non-magnetic material, for example, a plate of sheet brass. This backing plate is also adapted to serve as a guide for properly positioning the supporting columns, such as shown at 23, with reference to the stator 10 and also to serve as means for determining the proper relative position of the base-plate 11 to the stator 10 when assembling the parts. To this end, the base plate 11 is provided with a journal member 24 which projects both forwardly and backwardly from the plate, the backwardly projecting portion being arranged to fit snugly in a perforation 25 formed in backing plate 22 for this purpose. This journal member 24 is adapted to support the shaft of a gear 26, shown in broken lines in Fig. 1, which meshes with the rotor pinion 27 in a manner adapted for speed reduction. The pinion 27, as shown in Figs. 2 and 3, is with advantage rigidly secured on a hollow shaft 28 which is adapted to rotate upon a stud 27' projecting up from the base plate 11.

On the shaft 28 is fitted a bushing 29 in tight relation thereto which bushing has a flange 30 extending out from its outer surface. This bushing and flange serve as a journal member for the rotor disk 16 which is loosely mounted thereon. Fitting tightly over the projecting end of the bushing 29 which carries the rotor disk is disposed a second or inertia disk 31. This second disk preferably has a relatively long radius as compared to its thickness, in order thereby to increase its mechanical moment of inertia. This second disk is also so positioned on the end of the bushing 29 that it presents a relatively large surface adapted for loose frictional engagement with one side of the rotor disk. By this arrangement, it is seen that the rotor disk 16 and the inertia disk 31 are capable of relative motion, but by reason of the loose frictional engagement, a relative self movement of one member with respect to the other would tend to be damped out.

In order to effect a positive driving connection between the rotor disk 16 and the pinion 27, a yielding thrust transmitting member is provided therebetween, which may be of any suitable form; for example, a spiral spring 32, one end of which is made fast in a projecting stud 33 on the rotor disk, the other end being made fast upon the hub 34 of the bushing 29.

While the rotor disk 16 may have any convenient form adapted for running with revolutions executed in precisely timed intervals and keeping step with the flux and thereby transmitting power to the connections here described, it is preferable that the rotor disk and the pole shoes 12 and 13 be cooperatively formed so as to execute but part of a revolution with each change of flux and thereby drive at a sub-synchronous speed.

This is here accomplished by providing the cooperating faces of the pole shoes and of the rotor disk with a series of notches or small salient poles in the manner indicated in the drawings, so as to be drawn merely through the small angle subtended by the median through one such pole to the next with each change of flux.

In operation, it is seen that when the field 19 is energized, alternating flux traverses the stator and threads across the pole-shoes 12 and 13 through the rotor disk, which when given a proper starting impulse, will rotate at the sub-synchronous speed for which it is designed, transmitting driving force through the spring 32 to the hub 34 and to the pinion 27 and thence to the shaft turning the journal member 24. The spring 32 during this process is put under tension which is proportional to the driving force transmitted. It is also observed that the loose frictional engagement between the rotor disk 16 and the inertia disk 31 damps out any periodic motion which tends to arise. Should any irregularity in the flux pulsations occur which requires either an advance or a retardation by a small fractional turn on the part of the rotor disk, it is seen that such accommodation is readily had, as the rotor disk is free to turn to the position required and thereby but slightly increases or decreases the tension in the yielding member 32, the inertia member operating at the same time to maintain the general speed of the drive while this accommodation takes place. The loose frictional engagement between the rotor disk 16 and the inertia disk 31 also operates to damp out any oscillation or periodic relative motion that may tend to arise between these members on account of this sudden variation in the magnetic field.

The particular motor herein illustrated is designed to operate at a speed which is a fraction of the synchronous speed of the power line, but within the broad scope of this invention the synchronous motor may bear a different fractional relation to that theoretical synchronous speed and when the term synchronous operation or synchronous speed is used herein it will be understood to mean a speed which is determined by the frequency of the power line whether it be strictly in full synchronism or whether it be a sub-synchronous even fraction thereof.

It will be observed that the frictional connection between the rotor and the train absorbs the energy of hunting and converts it into heat which is non-dynamic in the sense that it cannot be readily restored again as active kinetic energy such as would be the case if a fly wheel or a similar device were employed. This is an important distinction since if the energy is absorbed dynamically it is again restored as kinetic energy to the system and this opposes the dampening effect. Where the energy of oscillation, however, is converted into heat, it is quickly lost to the system in kinetic form and the oscillations quickly destroyed. It will be obvious that different forms of absorption of the dynamic energy may be employed if desired.

By this arrangement, it is seen that easy starting and steady driving by the synchronous motor of the present invention is substantially at all times insured while the field is energized. It is seen, however, that slight variations in the load or in the driving force are substantially without disturbing effects upon the operation of the motor. The mode of construction is also seen to insure rapid and accurate assembly of the parts for precise operation and is thus particularly adapted for the construction of synchronous motors to be used for the driving of clock-trains and the like.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described our invention, what we claim as new and desire to secure by Letters Patent, is:

1. In a synchronous motor of the character described, the combination comprising a stator, means for energizing the same, a rotor, driven means associated with said rotor, a yielding member for transmitting driving force from said rotor to said driven means, and an inertia member disposed in loose frictional engagement with said rotor, and adapted to rotate with the same.

2. In a synchronous motor of the character described, the combination comprising a stator, means for energizing the same, a rotor, driven means associated with said rotor, spring means connecting said rotor mechanically to said driven means, and an inertia member disposed in loose frictional engagement with said rotor and adapted to rotate with the same.

3. In a synchronous motor of the character described, the combination comprising a stator, means for energizing the same, a rotor, driven means associated with said rotor, spring means connecting said rotor mechanically to said driven means, and an inertia disk secured to said driven means, but in loose frictional engagement with said rotor.

4. In a synchronous motor of the character described, the combination comprising a stator, means for energizing the same, a driven shaft rotatably associated with said stator, a rotor loosely mounted to turn on said driven shaft, a resilient thrust member mechanically connecting said rotor to said shaft, and an inertia member mounted on said shaft in loose frictional engagement with said rotor.

5. In a synchronous motor of the character described, the combination comprising a stator, means for energizing the same, a driven shaft rotatably associated with said stator, a rotor disk loosely mounted on said shaft, a spring connection between said rotor disk and said shaft for transmitting driving force therethrough, and an inertia disk secured on said shaft and arranged to make a loose surface contact with said rotor disk.

6. A removable housing adapted to be fitted cooperatively upon bi-polar stators for synchronous type electric motors, comprising a base, pole-shoes fitted thereon, a rotor adapted to rotate therebetween, a driven member journalled on said base, said rotor being loosely mounted on said member, a yielding thrust member connecting said rotor to said driven member, and an inertia means on said driven member arranged to have damping engagement with said rotor.

7. A removable housing adapted to be fitted cooperatively upon bi-polar stators for synchronous type electric motors, comprising a base, pole-shoes fitted thereon, a stud projecting from said base, a hollow drive shaft journalled on said shaft, a rotor disk loosely mounted on said shaft, a spiral spring arranged to connect said rotor disk and said hollow shaft in driving relation, and an inertia disk secured to said hollow shaft, and adapted to make loose surface contact with said rotor disk.

8. In a synchronous motor of the character described, the combination comprising a stator, means for energizing the same, a rotor, driven means associated with said rotor, relatively movable rotor and inertia disks operatively associated with said driven means, and a spring having one end mechanically connected to said rotor disk and the other mechanically connected to said inertia disk, said disks being arranged to have damping engagement.

9. In a synchronous motor of the character described in combination a driven train including members having a relatively considerable inertia, a rotor adapted to cooperate with stator pole pieces for synchronous rotation and a friction connection between the rotor and the driven train, and means for limiting relative movement between the rotor and train including means for resiliently maintaining a centered relative position between said rotor and train.

10. In a synchronous motor of the character described in combination a driven train including members having a relatively considerable inertia, a rotor adapted to cooperate with stator pole pieces for synchronous rotation and a friction connection between the rotor and the driven train and spring means resiliently connecting said rotor and said train and permitting movement in both directions from a neutral position.

11. In a synchronous motor of the character described in combination a driven train, an inertia member rigid with the train having sufficient inertia substantially to resist all hunting of the rotor and a rotor adapted to cooperate with stator members for synchronous rotation, and a friction connection between said rotor and said train, and means for limiting relative movement between the rotor and train.

12. In a synchronous motor of the character described in combination a driven train, an inertia member rigid with the train and a rotor adapted to cooperate with stator members for synchronous rotation and a friction connection between said rotor and said train, means for limiting relative movement between the rotor and train including means for resiliently maintaining a centered relative position between said rotor and train.

13. In a synchronous motor of the character described in combination a driven train, an inertia member rigid with the train and a rotor adapted to cooperate with stator members for synchronous rotation and a friction connection between said rotor and said train and spring means resiliently connecting said rotor and said train and permitting movement in both directions from a neutral position.

14. In a device of the character described, in combination a driven train, a rotor adapted to cooperate with stator pole pieces for synchronous rotation and a resilient connection between the train and the rotor and an energy absorbing dampening means of a magnitude substantially to dampen all relative vibrations between the rotor and train.

In testimony whereof we affix our signatures.

RICHARD H. WHITEHEAD.
WILSON E. PORTER.